US010723894B2

(12) United States Patent
Liu et al.

(10) Patent No.: US 10,723,894 B2
(45) Date of Patent: Jul. 28, 2020

(54) TIE LAYERS PREPARED FROM PARTICLE-CONTAINING WATERBORNE SUSPENSIONS

(71) Applicant: 3M INNOVATIVE PROPERTIES COMPANY, St. Paul, MN (US)

(72) Inventors: Lan H. Liu, Rosemount, MN (US); Audrey A. Sherman, Woodbury, MN (US); Haeen Sykora, Star Prairie, WI (US); Joan M. Noyola, Maplewood, MN (US); Sonja S. Mackey, St. Paul, MN (US); James P. Dizio, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 263 days.

(21) Appl. No.: 15/537,714

(22) PCT Filed: Dec. 15, 2015

(86) PCT No.: PCT/US2015/065802
§ 371 (c)(1),
(2) Date: Jun. 19, 2017

(87) PCT Pub. No.: WO2016/106022
PCT Pub. Date: Jun. 30, 2016

(65) Prior Publication Data
US 2018/0037754 A1    Feb. 8, 2018

Related U.S. Application Data

(60) Provisional application No. 62/095,929, filed on Dec. 23, 2014.

(51) Int. Cl.
| | |
|---|---|
| C09D 7/62 | (2018.01) |
| C09D 5/02 | (2006.01) |
| C09C 1/30 | (2006.01) |
| C09D 5/00 | (2006.01) |
| C09D 133/06 | (2006.01) |
| C08K 3/36 | (2006.01) |
| C08K 9/06 | (2006.01) |

(52) U.S. Cl.
CPC .............. *C09D 7/62* (2018.01); *C09C 1/3081* (2013.01); *C09D 5/002* (2013.01); *C09D 5/006* (2013.01); *C09D 5/028* (2013.01); *C09D 133/06* (2013.01); *C01P 2004/64* (2013.01); *C01P 2006/12* (2013.01); *C08K 3/36* (2013.01); *C08K 9/06* (2013.01)

(58) Field of Classification Search
CPC .... C09C 1/3081; C09D 133/06; C09D 5/002; C09D 5/006; C09D 5/028; C09D 7/62; C01P 2004/64; C01P 2006/12; C08K 3/36; C08K 9/06
See application file for complete search history.

(56) References Cited

U.S. PATENT DOCUMENTS

| | | | |
|---|---|---|---|
| RE24,906 E | 12/1960 | Ulrich | |
| 3,816,184 A * | 6/1974 | Redmore | .................. C02F 5/14 148/250 |
| 4,344,860 A * | 8/1982 | Plueddemann | ....... C01B 33/325 252/389.32 |
| 4,370,255 A * | 1/1983 | Plueddemann | ......... C23F 11/08 252/389.22 |
| 4,900,474 A | 2/1990 | Terae | |
| 5,028,679 A | 7/1991 | Terae | |
| 5,118,775 A | 6/1992 | Inomata | |
| 5,214,119 A | 5/1993 | Leir | |
| 5,223,465 A | 6/1993 | Ueki | |
| 5,236,997 A | 8/1993 | Fujiki | |
| RE34,605 E | 5/1994 | Schrenk | |
| 5,360,659 A | 11/1994 | Arends | |
| 5,461,134 A | 10/1995 | Leir | |
| 5,512,650 A | 4/1996 | Leir | |
| 5,527,578 A | 6/1996 | Mazurek | |
| 5,579,162 A | 11/1996 | Bjornard | |
| 5,858,545 A | 1/1999 | Everaerts | |
| 5,882,774 A | 3/1999 | Jonza | |
| 6,007,914 A | 12/1999 | Joseph | |
| 6,049,419 A | 4/2000 | Wheatley | |
| 7,153,924 B2 | 12/2006 | Kuepfer | |

(Continued)

FOREIGN PATENT DOCUMENTS

| | | | |
|---|---|---|---|
| EP | 0550915 | 7/1993 | |
| EP | 0550915 A1 * | 7/1993 | ............... C09D 1/00 |

(Continued)

OTHER PUBLICATIONS

International Search Report for PCT International Application No. PCT/US2015/065802, dated Mar. 7, 2016, 5 pages.
Wicht, Nanoporous Films with Low Refractive Index for Large-Surface Broad-Band Anti-Reflection Coatings, Macromolecular Materials and Engineering, 2010, vol. 295, pp. 628-636.

*Primary Examiner* — Travis M Figg
(74) *Attorney, Agent, or Firm* — Jeffrey M. Olofson

(57) ABSTRACT

Waterborne suspensions include surface treated silica particles, a water dispersable binder resin, at least one surfactant, and an aqueous solvent. The surface treated silica particles have a mixture of hydrophobic and hydrophilic silane surface treatment agents, where the ratio of hydrophilic silane surface treatment agent to hydrophobic silane surface treatment agent is greater than 1. The waterborne suspensions can be coated and dried to form nanostructured tie layers, especially tie layers to silicone or (meth)acrylate layers.

22 Claims, No Drawings

(56) References Cited

U.S. PATENT DOCUMENTS

| | | | |
|---|---|---|---|
| 8,534,849 B2 | 9/2013 | Coggio | |
| 2004/0068035 A1* | 4/2004 | Paiva | C09D 5/028 524/431 |
| 2007/0148475 A1 | 6/2007 | Sherman | |
| 2008/0287554 A1* | 11/2008 | Gittins | C09C 1/02 516/9 |
| 2009/0260297 A1* | 10/2009 | Seth | B24D 3/00 51/295 |
| 2011/0021797 A1* | 1/2011 | Tiefenbruck | C09C 1/3063 556/9 |
| 2011/0151168 A1* | 6/2011 | Meyer | B32B 27/32 428/41.3 |
| 2012/0271025 A1 | 10/2012 | Hays | |
| 2012/0282455 A1 | 11/2012 | Hao | |
| 2014/0022644 A1 | 1/2014 | Hao | |

FOREIGN PATENT DOCUMENTS

| | | | |
|---|---|---|---|
| EP | 2116322 A1 * | 11/2009 | B23K 11/11 |
| EP | 2878621 A1 * | 6/2015 | C08K 9/04 |
| WO | WO 1996-018691 | 6/1996 | |
| WO | WO-9618691 A2 * | 6/1996 | A61F 9/022 |
| WO | WO 1996-034028 | 10/1996 | |
| WO | WO 1996-034030 | 10/1996 | |
| WO | WO 1996-035458 | 11/1996 | |
| WO | WO 1997-040103 | 10/1997 | |
| WO | WO 1998-017726 | 4/1998 | |
| WO | WO 2000-002966 | 1/2000 | |
| WO | WO 2010-120468 | 10/2010 | |
| WO | WO 2010-120845 | 10/2010 | |
| WO | WO 2010-120864 | 10/2010 | |
| WO | WO 2010-120871 | 10/2010 | |
| WO | WO 2010-120971 | 10/2010 | |
| WO | WO 2010-121019 | 10/2010 | |
| WO | WO 2012-054680 | 4/2012 | |
| WO | WO 2015-116459 | 8/2015 | |

* cited by examiner

TIE LAYERS PREPARED FROM PARTICLE-CONTAINING WATERBORNE SUSPENSIONS

FIELD OF THE DISCLOSURE

The present application relates generally to nanostructured tie layers and laminate articles using the same. The present application more specifically relates to nanostructured tie layers that bond layers to a substrate.

BACKGROUND

Priming layers are used when bonding or coating two different materials together. One objective of the priming layer is to control the level of adherence of one material to another. The priming layer can be used to increase bond strength between two layers.

Where a coating is applied to a substrate and the composition of the coating does not have a natural affinity for the substrate, a primer layer can be used. Materials such as polyethylene terephthalate or polyolefins have well known problems in having coatings adhered thereto.

As adhesives are being designed with higher and higher adhesion to adherends and or target surfaces, the need for better and better priming is recognized to provide the required bond strength between the backing and the adhesive of these adhesive articles. The ability to provide higher strength primers or tie layers on specific target backings enables the creation of new adhesive articles having aggressive adhesives.

A number of coatings that utilize metal oxide particles have been prepared. In some the coatings are anti-reflective (AR) coatings. PCT Publication No. WO 96/18691 (Scholz et al.) describes coating compositions that impart anti-reflective and anti-fog properties to substrates coated therewith. The coating composition utilizes an inorganic metal oxide in combination with particular anionic surfactants. In US Patent Publication No. 2014/0022644 (Hao et al.) anti-reflective films are described comprising a light transmissive substrate and a low refractive index layer disposed on the light transmissive substrate. The low refractive index layer comprises the reaction product of polymerizable resin composition comprising at least 20 wt-% fumed silica.

Application U.S. Patent Ser. No. 62/055,758 filed Sep. 26, 2014, describes aqueous coating compositions for floor finishes or polishes that include modified particles that have an inorganic core and a surface that includes hydrophobic and hydrophilic moieties adhering to the surface.

In US Patent Publication No. 2012/0282455 (Hao et al.), nano-porous adhesive tie layers are described that include a binder including a multifunctional acrylate and a polyurethane, surface treated nanoparticles dispersed in the binder, and a plurality of interconnected voids.

SUMMARY

This disclosure describes suspensions, tie layers prepared from the suspensions, laminates that include the tie layers, and methods of preparing the laminates. In some embodiments the suspension comprises surface treated silica particles, a water dispersable binder resin, at least one surfactant, and an aqueous solvent comprising at least water. The surface treated silica particles comprise a mixture of hydrophobic and hydrophilic silane surface treatment agents, where the ratio of hydrophilic silane surface treatment agent to hydrophobic silane surface treatment agent is greater than 1.

In some embodiments the tie layer comprises a nanostructured layer comprising a dried coating of a suspension, where the suspension comprises surface treated silica particles, a water dispersable binder resin, at least one surfactant, and an aqueous solvent comprising at least water. The surface treated silica particles comprise a mixture of hydrophobic and hydrophilic silane surface treatment agents, where the ratio of hydrophilic silane surface treatment agent to hydrophobic silane surface treatment agent is greater than 1.

In some embodiments the laminates comprise a substrate with a first major surface and second major surface, a tie layer in contact with at least a portion of the second major surface of the substrate, and a silicone-based or (meth)acrylate-based layer in contact with the tie layer. The tie layer comprises a nanostructured layer comprising a dried coating of a suspension, where the suspension comprises surface treated silica particles, a water dispersable binder resin, at least one surfactant, and an aqueous solvent comprising at least water. The surface treated silica particles comprise a mixture of hydrophobic and hydrophilic silane surface treatment agents, where the ratio of hydrophilic silane surface treatment agent to hydrophobic silane surface treatment agent is greater than 1.

In some embodiments the method of preparing a laminate construction comprises providing a substrate with a first major surface and second major surface, providing a waterborne suspension, coating the waterborne suspension on at least a portion of the second major surface of the substrate, drying the coating of the waterborne suspension to form a nanostructured tie layer, and applying a silicone-based or (meth)acrylate-based layer to the nanostructured tie layer to form a laminate. The waterborne suspension comprises surface treated silica particles, a water dispersable binder resin, at least one surfactant, and an aqueous solvent comprising at least water. The surface treated silica particles comprise a mixture of hydrophobic and hydrophilic silane surface treatment agents, where the ratio of hydrophilic silane surface treatment agent to hydrophobic silane surface treatment agent is greater than 1.

DETAILED DESCRIPTION

The bonding together of two different types of materials can be problematic. As newer materials are developed that have surfaces that are increasingly difficult to adhere to, a variety of surface treatment methods have been developed to permit the adhesion of different types of materials to each other. In some instances physical treatments such as surface etching, and the like are used, but these treatments can damage or otherwise change the surface in ways that can be undesirable. Another method is use priming layers or tie layers. These layers are ones which adhere well to both materials to be bonded and thus "tie" the different material layers together. In many applications, especially in areas such as electronic and optical articles, the requirements for priming or tie layers are becoming increasingly demanding. Not only do the tie layers have to adhere to two different materials, they also have to have other properties required by the articles in which they are incorporated. Among these properties can be optical clarity, durability over time (the ability to not yellow, crack, peel, delaminate, or otherwise degrade over the lifetime of the device), insensitivity to environmental conditions such as heat, humidity, sunlight, and the like, ease of handling, ease of lamination (the ability to be laminated to a rigid or nonrigid substrate without having air bubbles or other defects in the bondline), and the like.

Coupled with the desire for tie layers with enhanced properties is the desire to have tie layers that are environmentally friendly. One major trend in the area of coatings in general is the desired to eliminate the use of solvents. By solvents it is meant organic-based solvents. The use of solvent-borne coating materials often requires expensive equipment to recover or eliminate vaporized solvent. Additionally, since many solvents are flammable, the use of solvent-borne coating materials often requires special equipment and handling techniques.

Among the replacement coating materials for solvent-borne coating materials are those that are 100% solids (typically applied as a hot melt coating) and waterborne coating materials. Each of these types of coating material have challenges, but the need for replacements for solvent-borne coating materials is growing as the use of solvents becomes more and more disfavored and more and more coating equipment is implemented which cannot utilize solvent-borne coating materials.

Water, while it could be considered to be a "solvent" is generally considered to be a different type of material, as materials that are considered to be solvents are generally organic-based. Because most coating materials are organic-based materials, water is not a particularly well suited solvent to dissolve or disperse these types of materials. Therefore, special care and special techniques are used to make the coating materials dissolvable or dispersible in water. However, these special techniques can render the coating materials suitable for use as, for example a tie layer. An example of a commonly used technique is the example of soap, where the soap molecules have one end that is organic and the other end is ionic or highly polar. The ionic or highly polar end makes the molecule dissolve or suspend in the water, forming bubbles or micelles. While waterborne soap molecules form a stable dispersion/solution, such materials are unsuitable in forming tie layers. Thus other techniques need to be developed to permit the formation of waterborne tie layer coatings.

It would be desirable to have waterborne suspensions or dispersions that could be applied to a wide range of substrate surfaces to form a uniform coating, and that upon drying form a tie layer to which a variety of coating layers could be applied. In this way the advantages of tie layers could be combined with the advantages of waterborne delivery.

As mentioned above, the preparation of a waterborne coating suspension or dispersion that will produce a coating that has the same properties as one delivered from solvent is a very difficult task. Because making a suspension or dispersion waterborne requires special techniques, one cannot simply take a desirable solvent-borne coating solution, replace the solvent with water, and expect to get the same result as with a solvent. In many instances the material will not even dissolve or be suspended in water. If the organic coating material is modified to make it water soluble or dispersible, these changes can adversely affect the properties of the coating formed by the modified organic coating material. Thus making tie layer coatings that can be delivered as waterborne materials and have the desirable properties of solvent-borne coatings is not a trivial undertaking.

In this disclosure, waterborne suspensions are described which are useful for preparing tie layer coatings. These tie layer coatings can be coated onto a wide range of substrates, and are suitable for forming laminates between substrates and silicone layers. In some embodiments, the tie layer coatings of this disclosure can function not only as tie layers, but also as anti-reflection coatings (AR coatings). An anti-reflection coating (AR) is a single layer or multilayer coating applied to an optical surface to reduce its reflectance and thereby increase its transmittance, the difference of refractive indices between the thin low index layer ($n_1$) and the under coating/film layer ($n_2$), is given by $$I_R = \left(\frac{n_2 - n_1}{n_2 + n_1}\right)^2.$$

The waterborne tie layer of the present disclosure creates an effective medium where the index is gradually varying between the neighboring materials and forms a thin gradient nanostructure, the same principle as moth-eye structures. Moth-eye antireflective (AR) structures are arrays of protuberances, with dimensions smaller than the wavelength of the light incident upon them. They form a region of graded refractive index at the interface between two media, substantially reducing the amount of light reflected by the interface.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are heat activated adhesives, pressure sensitive adhesives, and curable adhesives.

Heat activated adhesives are non-tacky at room temperature but become tacky and capable of bonding to a substrate at elevated temperatures. These adhesives usually have a $T_g$ (glass transition temperature) or melting point ($T_m$) above room temperature. When the temperature is elevated above the $T_g$ or $T_m$, the storage modulus usually decreases and the adhesive becomes tacky.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The term "aqueous" as used herein is the commonly understood meaning of the term, meaning that the liquid contains at least water, but may also contain some other water miscible liquids.

The term "nanostructured" as used herein refers to coatings that are structured, that is to say they are not flat, and the structures are on the nanometer scale, that is to say less than 1,000 nanometers.

The term "hydrocarbon group" as used herein refers to any monovalent group that contains primarily or exclusively carbon and hydrogen atoms. Alkyl and aryl groups are examples of hydrocarbon groups.

The term "silicone-based" as used herein refers to macromolecules that contain silicone units. The terms silicone or siloxane are used interchangeably and refer to units with dialkyl or diaryl siloxane (—SiR$_2$O—) repeating units.

The term "(meth)acrylate-based" as used herein refers to macromolecules or mixtures of macromolecules prepared from (meth)acrylate monomers, and may also include other free radically polymerizable co-monomers.

The term "self wetting" refers to an adhesive which is very soft and conformable and is able to be applied with very low lamination pressure. Such adhesives exhibit spontaneous wet out to surfaces.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "heteroalkylene" refers to a divalent group that includes at least two alkylene groups connected by a thio, oxy, or —NR— where R is alkyl. The heteroalkylene can be linear, branched, cyclic, substituted with alkyl groups, or combinations thereof. Some heteroalkylenes are poloxyyalkylenes where the heteroatom is oxygen such as for example,

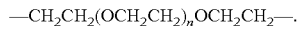
—CH$_2$CH$_2$(OCH$_2$CH$_2$)$_n$OCH$_2$CH$_2$—.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "heteroarylene" refers to a divalent group that is carbocyclic and aromatic and contains heteroatoms such as sulfur, oxygen, nitrogen or halogens such as fluorine, chlorine, bromine or iodine.

The term "aralkylene" refers to a divalent group of formula —R$^a$—Ar$^a$— where R$^a$ is an alkylene and Ar$^a$ is an arylene (i.e., an alkylene is bonded to an arylene).

The term "(meth)acrylate" refers to monomeric acrylic or methacrylic esters of alcohols. Acrylate and methacrylate monomers or oligomers are referred to collectively herein as "(meth)acrylates". Materials referred to as "(meth)acrylate functional" are materials that contain one or more (meth) acrylate groups.

Unless otherwise indicated, "optically transparent" refers to an article, film or adhesive that has a high light transmittance over at least a portion of the visible light spectrum (about 400 to about 700 nm). An optically transparent article may have light transmittance of 90% or higher. The term "transparent film" refers to a film having a thickness and when the film is disposed on a substrate, an image (disposed on or adjacent to the substrate) is visible through the thickness of the transparent film. In many embodiments, a transparent film allows the image to be seen through the thickness of the film without substantial loss of image clarity. In some embodiments, the transparent film has a matte or glossy finish.

Unless otherwise indicated, "optically clear" refers to an adhesive or article that has a high light transmittance over at least a portion of the visible light spectrum (about 400 to about 700 nm), and that exhibits low haze, such as a haze of less than 1% at a thickness of 50 micrometers or even 0.5% at a thickness of 50 micrometers. Optically clear adhesives or articles are color neutral on the CIE Lab scale, with the a or b values being less than 0.5. Optically clear articles typically have light transmittance over at least a portion of the visible light spectrum of at least 95%, and in some instances as high as 98% or even higher.

Disclosed herein are aqueous suspensions, tie layers prepared from these aqueous suspensions, laminates that include these tie layers, and methods of preparing these laminates.

Aqueous suspensions suitable for preparing tie layers comprise surface treated silica particles, where the surface treated silica particles comprise a mixture of hydrophobic and hydrophilic silane surface treatment agents, such that the ratio of hydrophilic silane surface treatment agent to hydrophobic silane surface treatment agent is greater than 1, a water dispersable binder resin, at least one surfactant, and an aqueous solvent comprising at least water. While not wishing to be bound by theory, it is believed that the combination of the hydrophilic silane surface treating agent and hydrophobic silane surface treating agent on the same particle provides a balance of aqueous dispersibility and desirable tie layer properties.

A wide variety of silica particles are suitable for use in the aqueous dispersions. Particularly suitable are particles of fumed silica, also known as pyrogenic silica because it is produced in a flame. Fumed silica consists of microscopic droplets of amorphous silica fused into branched, chainlike, three-dimensional secondary particles which then agglomerate into tertiary particles. The resulting powder has an extremely low bulk density and high surface area. Its three-dimensional structure results in viscosity-increasing, thixotropic behavior when used as a thickener or reinforcing filler. In some embodiments, particles that are highly branched or structured may be used. Such particles prevent efficient packing in the binder matrix and allow interstitial voids or pores to form. Exemplary materials include highly branched or structured particles include CAB-O-SIL fumed silicas or silica dispersions, such as, for example, those sold under trade designations EHS, TS 520, or pre-dispersed fumed silica particles such as those available as CAB-O-SPERSE PG 001, PG 002, PG 022, 1020K, 4012K, 1015 and 2017A (available from Cabot Corporation, Boston, Mass.). In some embodiments, aggregates of these exemplary fumed metal oxides include a plurality of primary particles in the range of about 8 nm to about 20 nm and form a highly branched structure with a wide distribution of sizes ranging from about 80 nm to greater than 300 nm. Another way of describing these irregular particles is to compare the surface area of the irregular particles to that of a spherical particle. In some embodiments, the silica particles have an average surface area equivalent to a spherical particle with a surface are of 14 $nm^2$.

The fumed silica particles are treated with a mixture of at least two surface treatment agents, one of which is hydrophilic the other is hydrophobic. The surface treatment agents are silanes, as silanes are the preferred surface treatment agent for silica because silanes provide strong anchorage to silica particles. The silane surface treatment agents are of the general structure: $R^1R^2R^3Si$—X where each $R^1$, $R^2$, and $R^3$ is independently an alkyl or alkoxy group with the proviso that at least one is an alkoxy group, typically an alkoxy group with 1-3 carbon atoms. Many commercially available silane surface treatment agents have $R^1$, $R^2$, and $R^3$ as the same alkoxy group, typically methoxy or ethoxy. The X group is either a hydrophilic group or a hydrophobic group. The terms "hydrophilic" and "hydrophobic" are used according to their conventional meanings. Examples of hydrophilic X groups are polyether groups, also called alkylene oxide groups, typically containing at least some ethylene oxide groups (—O—$CH_2$—$CH_2$—) groups and may contain other ether groups such as propylene oxide groups. Polyethylene oxide groups (PEO) are well known hydrophilic groups. Examples of hydrophobic X groups include a wide variety of hydrocarbon groups, include alkyl, and aryl groups. Typically, the hydrophobic silane surface treatment agent has an X group that is an alkyl group with 1-12 carbon atoms.

Examples of suitable silane surface treatment agents include the hydrophilic silanes available from Momentive Performance Materials, Inc, Waterford, N.Y. under the trade name A1230, and the hydrophobic isooctyl trimethoxy silane available from Gelest, Morrisville, Pa.

Typically, the silica particles comprise at least 75% surface coverage by the surface treatment agents. As described above, the silica particles are irregular in shape, and the surface coverage refers to the exposed silica surface of the irregularly shaped particles.

As stated above, the ratio of hydrophilic silane surface treatment agent to hydrophobic silane surface treatment agent is greater than 1, meaning that there is a majority of hydrophilic silane surface treatment agent present. Expressed in a percentage basis (based upon the number of equivalents), greater than 50% of the surface treatment agent present is hydrophilic surface treatment agent, for example, at least 51:49 hydrophilic to hydrophobic. While a wide range of ratio of hydrophilic to hydrophobic surface treatment agents can be used, typically the ratio of hydrophilic surface treatment agent to hydrophobic surface treatment agent is much greater than 1. In some embodiments, the ratio of hydrophilic silane surface treatment agent to hydrophobic silane surface treatment agent is in the range of 90:10 to 98:2, based upon the number of equivalents.

The aqueous suspension also includes a water dispersable binder resin. Examples of suitable water dispersable binder resins include polyvinylalcohol, (PVA), polyvinylbutyral (PVB), polyvinyl pyrrolidone (PVP), polyethylene vinyl acetate copolymers (EVA), polyurethanes (PURs), and poly (meth)acrylates, Examples of some commercially available binders useful in the aqueous suspensions are ethylene vinyl acetate dispersions available under the designated trade name VINAPASS 192, VINAPASS 400, VINAPASS 420 (Wacker Chemie, Burghausen, Germany), urethane acrylate dispersions such NEOCRYL XK-98, A614 and NEO PAC R 9699, NEORES (available from DSM, Newark, Del.) or the self-crosslinking acrylate dispersions available from Dow Chemical Company under the trade names RHOPLEX TR407, RHOPLEX HA-12, and RHOPLEX HA-16. Particularly suitable water dispersable binder resins are poly (meth)acrylate binder resins, polyvinyl alcohol binder resins, and combinations thereof, particularly the self-crosslinking acrylate dispersions available from Dow Chemical Company under the trade names RHOPLEX TR407, RHOPLEX HA-12, and RHOPLEX HA-16.

The aqueous suspension also includes at least one surfactant. Particularly suitable are silicone surfactants such as DOW CORNING Q2-5212 SUPERWETTING AGENT from Dow Corning, Midland, Mich. and the BYK family of silicone surfactants BYK 345, BYK 346, BYK 347, BYK 348, and BYK 349 from ALTANA, Wallingford, Conn.

Aqueous suspensions such as the ones of the present disclosure are often described by the total amount of solid content present in the suspension. In the present suspensions the solid components are the surface-modified silica particles, the binder resin and the surfactant. Typically, the total solids content of the surface-modified silica particles and the binder resin is set equal to 100 parts by weight. The amount of surfactant used is generally 1 part by weight based upon a total of 100 parts by weight of the surface-modified silica particles and the binder resin. In some embodiments, the amount of surface-modified silica particles is in the range of 60-70 parts, and the amount of binder resin is 30-40 parts.

In addition to the above solid components, the aqueous suspensions of this disclosure can contain other optional solid additives, as long as they additives do not interfere with the formation or stability of the suspension or the ultimate properties of coatings of the dried suspension.

The aqueous suspension also comprises water, and may also include one or more water miscible liquids, such as for example: alcohols such as methanol, ethanol, isopropanol, and methoxy propanol; and ketones such as acetone, and methyl ethyl ketone (MEK). Typically, water is the primary liquid media even if other water miscible liquids are present. In some embodiments, water is the only liquid medium.

The aqueous suspensions described above are used to prepare tie layers. The tie layers are formed by coating and drying the aqueous suspensions as will be discussed in greater detail below. The tie layer comprises a nanostructured layer comprising a dried coating of a suspension comprising surface treated silica particles, wherein the surface treated silica particles comprise a mixture of hydrophobic and hydrophilic silane surface treatment agents, such that the ratio of hydrophilic silane surface treatment agent to hydrophobic silane surface treatment agent is greater than 1, a water dispersable binder resin, at least one surfactant, and an aqueous solvent comprising at least water. Each of these components is described above.

A wide range of thicknesses for the tie layer are suitable. It is often desirable for the tie layer to be relatively thin.

Typically the tie layer is at least 0.1 micrometers thick up to 5.0 micrometers. In some embodiments the thickness is 0.2-3.0 micrometers.

As described above, the tie layers, in some embodiments, can function not only as tie layers but also as antireflection coatings (AR coatings). These coatings are similar to the coatings described in US Patent Publication No. 2014-0022644 (Hao et al.). It is surprising that the waterborne suspensions of this disclosure are able to provide coatings with the same type of AR properties as the solvent-borne compositions of Hao et al.

Also disclosed are laminates comprising a substrate with a first major surface and second major surface, a tie layer in contact with at least a portion of the second major surface of the substrate, and a silicone-based or (meth)acrylate-based layer in contact with the tie layer. The tie layer comprises a nanostructured layer comprising a dried coating of a suspension comprising surface treated silica particles, where the surface treated silica particles comprise a mixture of hydrophobic and hydrophilic silane surface treatment agent, such that the ratio of hydrophilic silane surface treatment agent to hydrophobic silane surface treatment agent is greater than 1, water dispersable binder resin, at least one surfactant, and an aqueous solvent comprising at least water, as has been described above. One advantage of some embodiments of the tie layers of this disclosure is their ability to adhere strongly to both silicone-based and (meth)acrylate-based layers.

A wide variety of substrates are suitable in the laminates of this disclosure. The substrate may be a rigid substrate or a non-rigid substrate. Examples of rigid substrates include glass plates, relatively thick polymeric plates such as polymethyl methacrylate (PMMA) plates and polycarbonate (PC) plates, and the exterior surface of a device. In some embodiments, the rigid substrates are part of devices that require special properties such as optical clarity.

Examples of suitable non-rigid substrates include polymeric films. Examples of polymeric films include films comprising one or more polymers such as cellulose acetate butyrate; cellulose acetate propionate; cellulose triacetate; poly(meth)acrylates such as polymethyl methacrylate; polyesters such as polyethylene terephthalate, and polyethylene naphthalate; copolymers or blends based on naphthalene dicarboxylic acids; polyether sulfones; polyurethanes; polycarbonates; polyvinyl chloride; syndiotactic polystyrene; cyclic olefin copolymers; and polyolefins including polyethylene and polypropylene such as cast and biaxially oriented polypropylene. The substrate may comprise single or multiple layers, such as polyethylene-coated polyethylene terephthalate. The substrate may be primed or treated to impart some desired property to one or more of its surfaces. Examples of such treatments include corona, flame, plasma and chemical treatments.

One particularly suitable class of film substrates are optical films. As used herein, the term "optical film" refers to a film that can be used to produce an optical effect. The optical films are typically polymer-containing films that can be a single layer or multiple layers. The optical films can be of any suitable thickness. The optical films often are at least partially transmissive, reflective, antireflective, polarizing, optically clear, or diffusive with respect to some wavelengths of the electromagnetic spectrum (e.g., wavelengths in the visible ultraviolet, or infrared regions of the electromagnetic spectrum). Exemplary optical films include, but are not limited to, visible mirror films, color mirror films, solar reflective films, diffusive films, infrared reflective films, ultraviolet reflective films, reflective polarizer films such as brightness enhancement films and dual brightness enhancement films, absorptive polarizer films, optically clear films, tinted films, dyed films, privacy films such as light-collimating films, and antireflective films, antiglare films, soil resistant films, and anti-fingerprint films.

Some optical films have multiple layers such as multiple layers of polymer-containing materials (e.g., polymers with or without dyes) or multiple layers of metal-containing material and polymeric materials. Some optical films have alternating layers of polymeric material with different refractive indices. Other optical films have alternating polymeric layers and metal-containing layers. Exemplary optical films are described in the following patents: U.S. Pat. No. 6,049,419 (Wheatley et al.); U.S. Pat. No. 5,223,465 (Wheatley et al.); U.S. Pat. No. 5,882,774 (Jonza et al.); U.S. Pat. No. 6,049,419 (Wheatley et al.); U.S. Pat. No. RE 34,605 (Schrenk et al.); U.S. Pat. No. 5,579,162 (Bjornard et al.), and U.S. Pat. No. 5,360,659 (Arends et al.).

The laminates also include a silicone or a (meth)acrylate layer. A wide variety of silicone layers are suitable. In embodiments where the tie layer is to be used as an AR layer, the silicone or (meth)acrylate layer is generally selected to be optically transparent or optically clear. Typically the silicone layer comprises an elastomeric polymeric layer, and in many embodiments is a pressure sensitive adhesive. A wide variety of (meth)acrylate layers are suitable, typically the (meth)acrylate layer is a (meth)acrylate pressure sensitive adhesive or heat activated adhesive.

In some embodiments, the silicone layer comprises a siloxane pressure sensitive adhesive. Suitable siloxane pressure sensitive adhesives include, for example, those described in U.S. Pat. Nos. 5,527,578 and 5,858,545; and PCT Publication No. WO 00/02966. Specific examples include polydiorganosiloxane polyurea copolymers and blends thereof, such as those described in U.S. Pat. No. 6,007,914, and polysiloxane-polyalkylene block copolymers. Other examples of siloxane pressure sensitive adhesives include those formed from silanols, silicone hydrides, siloxanes, epoxides, and (meth)acrylates. When the siloxane pressure sensitive adhesive is prepared from (meth)acrylate-functional siloxanes, the adhesive is sometimes referred to as a siloxane (meth)acrylate.

The siloxane-based adhesive compositions comprise at least one siloxane elastomeric polymer and may contain other components such as tackifying resins. The elastomeric polymers include for example, urea-based siloxane copolymers, oxamide-based siloxane copolymers, amide-based siloxane copolymers, urethane-based siloxane copolymers, and mixtures thereof.

One example of a useful class of siloxane elastomeric polymers is urea-based silicone polymers such as silicone polyurea block copolymers. Silicone polyurea block copolymers include the reaction product of a polydiorganosiloxane diamine (also referred to as a silicone diamine), a diisocyanate, and optionally an organic polyamine. Suitable silicone polyurea block copolymers are represented by the repeating unit:

$$\left[ \begin{array}{c} \phantom{x} \\ -N-Z-N-\overset{O}{\overset{\|}{C}}-N-Y-\overset{R}{\underset{R}{Si}} \\ | \phantom{xx} | \phantom{xxx} | \\ H \phantom{xx} H \phantom{xxx} D \end{array} \left[ O-\overset{R}{\underset{R}{Si}} \right]_p Y-N-\overset{O}{\overset{\|}{C}} \right]_n \left[ N-Z-N-\overset{O}{\overset{\|}{C}}-N-B-N-\overset{O}{\overset{\|}{C}} \right]_m \tag{I}$$

wherein each R is a moiety that, independently, is an alkyl moiety, having about 1 to 12 carbon atoms, and may be substituted with, for example, trifluoroalkyl or vinyl groups, a vinyl radical or higher alkenyl radical represented by the formula $-R^d(CH_2)_a CH=CH_2$ wherein the $R^d$ group is $-(CH_2)_b-$ or $-(CH_2)_c CH=CH-$ and a is 1, 2 or 3; b is 0, 3 or 6; and c is 3, 4 or 5, a cycloalkyl moiety having from about 6 to 12 carbon atoms and may be substituted with alkyl, fluoroalkyl, and vinyl groups, or an aryl moiety having from about 6 to 20 carbon atoms and may be substituted with, for example, alkyl, cycloalkyl, fluoroalkyl and vinyl groups or R is a perfluoroalkyl group as described in U.S. Pat. No. 5,028,679, or a fluorine-containing group, as described in U.S. Pat. No. 5,236,997, or a perfluoroether-containing group, as described in U.S. Pat. Nos. 4,900,474 and 5,118,775; typically, at least 50% of the R moieties are methyl radicals with the balance being monovalent alkyl or substituted alkyl radicals having from 1 to 12 carbon atoms, alkenyl radicals, phenyl radicals, or substituted phenyl radicals;

each Z is a polyvalent radical that is an arylene radical or an aralkylene radical having from about 6 to 20 carbon atoms, an alkylene or cycloalkylene radical having from about 6 to 20 carbon atoms, in some embodiments Z is 2,6-tolylene, 4,4'-methylenediphenylene, 3,3'-dimethoxy-4,4'-biphenylene, tetramethyl-m-xylylene, 4,4'-methylenedicyclohexylene, 3,5,5-trimethyl-3-methylenecyclohexylene, 1,6-hexamethylene, 1,4-cyclohexylene, 2,2,4-trimethylhexylene and mixtures thereof;

each Y is a polyvalent radical that independently is an alkylene radical of 1 to 10 carbon atoms, an aralkylene radical or an arylene radical having 6 to 20 carbon atoms;

each D is selected from the group consisting of hydrogen, an alkyl radical of 1 to 10 carbon atoms, phenyl, and a radical that completes a ring structure including B or Y to form a heterocycle;

where B is a polyvalent radical selected from the group consisting of alkylene, aralkylene, cycloalkylene, phenylene, heteroalkylene, including for example, polyethylene oxide, polypropylene oxide, polytetramethylene oxide, and copolymers and mixtures thereof;

m is a number that is 0 to about 1000;

n is a number that is at least 1; and p is a number that is at least 10, in some embodiments 15 to about 2000, or even 30 to 1500.

Useful silicone polyurea block copolymers are disclosed in, e.g., U.S. Pat. Nos. 5,512,650, 5,214,119, 5,461,134, and 7,153,924 and PCT Publication Nos. WO 96/35458, WO 98/17726, WO 96/34028, WO 96/34030 and WO 97/40103.

Another useful class of silicone elastomeric polymers are oxamide-based polymers such as polydiorganosiloxane polyoxamide block copolymers. Examples of polydiorganosiloxane polyoxamide block copolymers are presented, for example, in US Patent Publication No. 2007-0148475. The polydiorganosiloxane polyoxamide block copolymer contains at least two repeat units of Formula II.

$$* \left[ \begin{array}{c} \phantom{x} \\ -N-Y-\overset{R^1}{\underset{R^1}{Si}}-\left[O-\overset{R^1}{\underset{R^1}{Si}}\right]_n-O-\overset{R^1}{\underset{R^1}{Si}}-Y-N-\overset{O}{\overset{\|}{C}}-\overset{O}{\overset{\|}{C}}-N-G-N-\overset{O}{\overset{\|}{C}}-\overset{O}{\overset{\|}{C}} \\ | \phantom{xx} \\ H \end{array} \right]_p * \tag{II}$$

In this formula, each $R^1$ is independently an alkyl, haloalkyl, aralkyl, alkenyl, aryl, or aryl substituted with an alkyl, alkoxy, or halo, wherein at least 50 percent of the $R^1$ groups are methyl. Each Y is independently an alkylene, aralkylene, or a combination thereof. Subscript n is independently an integer of 40 to 1500 and the subscript p is an integer of 1 to 10. Group G is a divalent group that is the residue unit that is equal to a diamine of formula $R^3HN\text{-}G\text{-}NHR^3$ minus the two $-NHR^3$ groups. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN\text{-}G\text{-}NHR^3$ is piperazine or the like). Each asterisk (*) indicates a site of attachment of the repeat unit to another group in the copolymer such as, for example, another repeat unit of Formula II.

Suitable alkyl groups for $R^1$ in Formula II typically have 1 to 10, 1 to 6, or 1 to 4 carbon atoms. Exemplary alkyl groups include, but are not limited to, methyl, ethyl, isopropyl, n-propyl, n-butyl, and iso-butyl. Suitable haloalkyl groups for $R^1$ often have only a portion of the hydrogen atoms of the corresponding alkyl group replaced with a halogen. Exemplary haloalkyl groups include chloroalkyl and fluoroalkyl groups with 1 to 3 halo atoms and 3 to 10 carbon atoms. Suitable alkenyl groups for $R^1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R^1$ often have 6 to 12 carbon atoms. Phenyl is an exemplary aryl group. The aryl group can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for $R^1$ usually have an alkylene group having 1 to 10 carbon atoms and an aryl group having 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group).

At least 50 percent of the $R^1$ groups are methyl. For example, at least 60 percent, at least 70 percent, at least 80 percent, at least 90 percent, at least 95 percent, at least 98 percent, or at least 99 percent of the $R^1$ groups can be methyl. The remaining $R^1$ groups can be selected from an alkyl having at least two carbon atoms, haloalkyl, aralkyl, alkenyl, aryl, or aryl substituted with an alkyl, alkoxy, or halo.

Each Y in Formula II is independently an alkylene, aralkylene, or a combination thereof. Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group having 6 to 12 carbon atoms bonded to an alkylene group having 1 to 10 carbon atoms. In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to group Y, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each subscript n in Formula II is independently an integer of 40 to 1500. For example, subscript n can be an integer up to 1000, up to 500, up to 400, up to 300, up to 200, up to 100, up to 80, or up to 60. The value of n is often at least 40, at least 45, at least 50, or at least 55. For example, subscript n can be in the range of 40 to 1000, 40 to 500, 50 to 500, 50 to 400, 50 to 300, 50 to 200, 50 to 100, 50 to 80, or 50 to 60.

The subscript p is an integer of 1 to 10. For example, the value of p is often an integer up to 9, up to 8, up to 7, up to 6, up to 5, up to 4, up to 3, or up to 2. The value of p can be in the range of 1 to 8, 1 to 6, or 1 to 4.

Group G in Formula II is a residual unit that is equal to a diamine compound of formula $R^3HN-G-NHR^3$ minus the two amino groups (i.e., $-NHR^3$ groups). Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN-G-NHR^3$ is piperazine). The diamine can have primary or secondary amino groups. In most embodiments, $R^3$ is hydrogen or an alkyl. In many embodiments, both of the amino groups of the diamine are primary amino groups (i.e., both $R^3$ groups are hydrogen) and the diamine is of formula $H_2N-G-NH_2$.

In some embodiments, G is an alkylene, heteroalkylene, polydiorganosiloxane, arylene, aralkylene, or a combination thereof. Suitable alkylenes often have 2 to 10, 2 to 6, or 2 to 4 carbon atoms. Exemplary alkylene groups include ethylene, propylene, butylene, and the like. Suitable heteroalkylenes are often polyoxyalkylenes such as polyoxyethylene having at least 2 ethylene units, polyoxypropylene having at least 2 propylene units, or copolymers thereof. Suitable polydiorganosiloxanes include the polydiorganosiloxane diamines of Formula II, which are described above, minus the two amino groups. Exemplary polydiorganosiloxanes include, but are not limited to, polydimethylsiloxanes with alkylene Y groups. Suitable aralkylene groups usually contain an arylene group having 6 to 12 carbon atoms bonded to an alkylene group having 1 to 10 carbon atoms. Some exemplary aralkylene groups are phenylene-alkylene where the phenylene is bonded to an alkylene having 1 to 10 carbon atoms, 1 to 8 carbon atoms, 1 to 6 carbon atoms, or 1 to 4 carbon atoms. As used herein with reference to group G, "a combination thereof" refers to a combination of two or more groups selected from an alkylene, heteroalkylene, polydiorganosiloxane, arylene, and aralkylene. A combination can be, for example, an aralkylene bonded to an alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

The polydiorganosiloxane polyoxamide tends to be free of groups having a formula $-R^a-(CO)-NH-$ where $R^a$ is an alkylene. All of the carbonylamino groups along the backbone of the copolymeric material are part of an oxalylamino group (i.e., the $-(CO)-(CO)-NH-$ group). That is, any carbonyl group along the backbone of the copolymeric material is bonded to another carbonyl group and is part of an oxalyl group. More specifically, the polydiorganosiloxane polyoxamide has a plurality of aminoxalylamino groups.

The polydiorganosiloxane polyoxamide is a linear, block copolymer and is an elastomeric material. Unlike many of the known polydiorganosiloxane polyamides that are generally formulated as brittle solids or hard plastics, the polydiorganosiloxane polyoxamides can be formulated to include greater than 50 weight percent polydiorganosiloxane segments based on the weight of the copolymer. The weight percent of the diorganosiloxane in the polydiorganosiloxane polyoxamides can be increased by using higher molecular weight polydiorganosiloxanes segments to provide greater than 60 weight percent, greater than 70 weight percent, greater than 80 weight percent, greater than 90 weight percent, greater than 95 weight percent, or greater than 98 weight percent of the polydiorganosiloxane segments in the polydiorganosiloxane polyoxamides. Higher amounts of the polydiorganosiloxane can be used to prepare elastomeric materials with lower modulus while maintaining reasonable strength.

Some of the polydiorganosiloxane polyoxamides can be heated to a temperature up to 200° C., up to 225° C., up to 250° C., up to 275° C., or up to 300° C. without noticeable degradation of the material. For example, when heated in a thermogravimetric analyzer in the presence of air, the copolymers often have less than a 10 percent weight loss when scanned at a rate 50° C. per minute in the range of 20° C. to about 350° C. Additionally, the copolymers can often be heated at a temperature such as 250° C. for 1 hour in air without apparent degradation as determined by no detectable loss of mechanical strength upon cooling.

The polydiorganosiloxane polyoxamide copolymers have many of the desirable features of polysiloxanes such as low glass transition temperatures, thermal and oxidative stability, resistance to ultraviolet radiation, low surface energy and hydrophobicity, high permeability to many gases, and insensitivity to moisture including humidity. Additionally, the copolymers exhibit good to excellent mechanical strength. Additionally these polymers can form self-wetting adhesive layers.

Another useful class of silicone elastomeric polymers is amide-based silicone polymers. Such polymers are similar to the urea-based polymers, containing amide linkages (—N(D)-C(O)—) instead of urea linkages (—N(D)-C(O)—N(D)-), where C(O) represents a carbonyl group and D is a hydrogen or alkyl group.

Such polymers may be prepared in a variety of different ways. Starting from the polydiorganosiloxane diamine described above in Formula II, the amide-based polymer can be prepared by reaction with a poly-carboxylic acid or a poly-carboxylic acid derivative such as, for example diesters. In some embodiments, an amide-based silicone elastomer is prepared by the reaction of a polydiorganosiloxane diamine and di-methyl salicylate of adipic acid.

An alternative reaction pathway to amide-based silicone elastomers utilizes a silicone di-carboxylic acid derivative such as a carboxylic acid ester. Silicone carboxylic acid esters can be prepared through the hydrosilation reaction of a silicone hydride (i.e. a silicone terminated with a silicon-hydride (Si—H) bonds) and an ethylenically unsaturated ester. For example a silicone di-hydride can be reacted with an ethylenically unsaturated ester such as, for example, $CH_2=CH-(CH_2)_n-C(O)-OR$, where C(O) represents a carbonyl group and n is an integer up to 15, and R is an alkyl, aryl or substituted aryl group, to yield a silicone chain capped with $-Si-(CH_2)_{n+2}-C(O)-OR$. The —C(O)—OR group is a carboxylic acid derivative which can be reacted with a silicone diamine, a polyamine or a combination thereof. Suitable silicone diamines and polyamines have been discussed above and include aliphatic, aromatic or oligomeric diamines (such as ethylene diamine, phenylene diamine, xylylene diamine, polyoxalkylene diamines, etc).

Another useful class of silicone elastomeric polymers is urethane-based silicone polymers such as silicone polyurea-urethane block copolymers. Silicone polyurea-urethane block copolymers include the reaction product of a polydiorganosiloxane diamine (also referred to as silicone diamine), a diisocyanate, and an organic polyol. Such materials are structurally very similar to the structure of Formula I except that the —N(D)-B—N(D)- links are replaced by —O—B—O— links. Examples are such polymers are presented, for example, in U.S. Pat. No. 5,214,119.

These urethane-based silicone polymers are prepared in the same fashion as the urea-based silicone polymers except that an organic polyol is substituted for an organic polyamine. Typically, since the reaction between an alcohol group and an isocyanate group is slower than the reaction between a amine group and an isocyanate group, a catalyst such as a tin catalyst commonly used in polyurethane chemistry, is used.

In some embodiments, a (meth)acrylate-based polymer can be used instead of the silicone polymers described above. Examples of suitable (meth)acrylate based polymers are (meth)acrylate pressure sensitive adhesives. Particularly suitable (meth)acrylate-based pressure sensitive adhesives include copolymers derived from: (A) at least one monoethylenically unsaturated alkyl (meth) acrylate monomer (i.e., alkyl acrylate and alkyl methacrylate monomer); and (B) at least one monoethylenically unsaturated free-radically copolymerizable reinforcing monomer. The reinforcing monomer has a homopolymer glass transition temperature (Tg) higher than that of the alkyl (meth)acrylate monomer and is one that increases the glass transition temperature and cohesive strength of the resultant copolymer. Herein, "copolymer" refers to polymers containing two or more different monomers, including terpolymers, tetrapolymers, etc.

Monomer A, which is a monoethylenically unsaturated alkyl acrylate or methacrylate (i.e., (meth)acrylic acid ester), contributes to the flexibility and tack of the copolymer. Generally, monomer A has a homopolymer Tg of no greater than about 0° C. Typically, the alkyl group of the (meth) acrylate has an average of about 4 to about 20 carbon atoms, or an average of about 4 to about 14 carbon atoms. The alkyl group can optionally contain oxygen atoms in the chain thereby forming ethers or alkoxy ethers, for example.

Examples of monomer A include, but are not limited to, 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, n-decyl acrylate, isodecyl acrylate, isodecyl methacrylate, and isononyl acrylate. Other examples include, but are not limited to, poly-ethoxylated or -propoxylated methoxy (meth)acrylates such as acrylates of CARBOWAX (commercially available from Union Carbide) and NK ester AM90G (commercially available from Shin Nakamura Chemical, Ltd., Japan). Suitable monoethylenically unsaturated (meth)acrylates that can be used as monomer A include isooctyl acrylate, 2-ethyl-hexyl acrylate, and n-butyl acrylate. Combinations of various monomers categorized as an A monomer can be used to make the copolymer.

Monomer B, which is a monoethylenically unsaturated free-radically copolymerizable reinforcing monomer, increases the glass transition temperature and cohesive strength of the copolymer. Generally, monomer B has a homopolymer Tg of at least about 10° C. Typically, monomer B is a reinforcing (meth)acrylic monomer, including an acrylic acid, a methacrylic acid, an acrylamide, or a (meth) acrylate. Examples of monomer B include, but are not limited to, acrylamides, such as acrylamide, methacrylamide, N-methyl acrylamide, N-ethyl acrylamide, N-hydroxyethyl acrylamide, diacetone acrylamide, N,N-dimethyl acrylamide, N, N-diethyl acrylamide, N-ethyl-N-aminoethyl acrylamide, N-ethyl-N-hydroxyethyl acrylamide, N,N-dihydroxyethyl acrylamide, t-butyl acrylamide, N,N-dimethylaminoethyl acrylamide, and N-octyl acrylamide. Other examples of monomer B include itaconic acid, crotonic acid, maleic acid, fumaric acid, 2,2-(diethoxy)ethyl acrylate, 2-hydroxyethyl acrylate or methacrylate, 3-hydroxypropyl acrylate or methacrylate, methyl methacrylate, isobornyl acrylate, 2-(phenoxy)ethyl acrylate or methacrylate, biphenylyl acrylate, t-butylphenyl acrylate, cyclohexyl acrylate, dimethyladamantyl acrylate, 2-naphthyl acrylate, phenyl acrylate, N-vinyl formamide, N-vinyl acetamide, N-vinyl pyrrolidone, and N-vinyl caprolactam. Particularly suitable reinforcing acrylic monomers that can be used as monomer B include acrylic acid and acrylamide. Combinations of various reinforcing monoethylenically unsaturated monomers categorized as a B monomer can be used to make the copolymer.

Generally, the (meth)acrylate copolymer is formulated to have a resultant Tg of less than about 0° C. and more typically, less than about −10° C. Such (meth)acrylate copolymers generally include about 60 parts to about 98 parts per hundred of at least one monomer A and about 2 parts to about 40 parts per hundred of at least one monomer B. In some embodiments, the (meth)acrylate copolymers have about 85 parts to about 98 parts per hundred or at least one monomer A and about 2 parts to about 15 parts of at least one monomer B.

In one embodiment, it has been found that silica particles that are modified with a mixture of hydrophilic silane and a polydimethyl siloxane silane as the hydrophobic silane, the tie layer formed is suitable with (meth)acrylate-based layers.

Also disclosed are methods of preparing laminate constructions. These methods comprise providing a substrate with a first major surface and a second major surface, providing a waterborne suspension, coating the waterborne suspension on at least a portion of the second major surface of the substrate, drying the coating of the waterborne suspension to form a nanostructured tie layer, and applying a silicone-based or (meth)acrylate-based layer to the nanostructured tie layer to form a laminate. The waterborne suspension comprises surface treated silica particles, where the surface treated silica particles comprise a mixture of hydrophobic and hydrophilic silane surface treatment agent, such that the ratio of hydrophilic silane surface treatment agent to hydrophobic silane surface treatment agent is greater than 1, a water dispersable binder resin, at least one surfactant, and an aqueous solvent comprising at least water, as has been discussed above.

The waterborne suspension can be coated onto the substrate in a variety of different ways. A number of conventional coating techniques are suitable, such as knife coating, roll coating, gravure coating, rod coating, curtain coating, air knife coating or printing techniques such as screen printing or inkjet printing. The thickness of the coating depends upon the desired dry thickness for the coating. For example, if a coating composition contains 33% solids, the dry thickness of the coating will be about 33% of the wet thickness of the coating composition.

Suitable substrates and silicone or (meth)acrylate layers have been described above. In addition to these layers, additional layers can be added to the composition. Particularly if the silicone or (meth)acrylate layer is an adhesive layer, it may be used to attach the laminate article to other substrates or layers.

The waterborne suspension can be prepared in a variety of ways as is well understood in the art. Typically the surface treated silica particles are prepared by heating silica particles dispersed in water or solvent with the combination of hydrophilic and hydrophobic silane treatment agents. These treated silica particles are then mixed with the water dispersable binder resin, at least one surfactant, and an aqueous solvent comprising at least water, and any optional additives to form the coating composition. It is generally desirable to maintain the pH of the coating composition in the basic range to aid in maintaining the stability of the coating composition (i.e. agglomeration can occur otherwise, for example).

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted. The following abbreviations are used: g=grams. The terms "weight %", "% by weight", and "wt %" are used interchangeably.

Table of Abbreviations

| Abbreviation or Trade Designation | Description |
|---|---|
| MSP-1 | Modified Silica Particles-1, see Synthesis Example S-1 below. |
| MSP-2 | Modified Silica Particles-2, see Synthesis Example S-2 below. |
| MSP-3 | Modified Silica Particles-3, see Synthesis Example S-3 below. |
| MSP-4 | Modified Silica Particles-4, see Synthesis Example S-4 below. |
| MSP-5 | Modified Silica Particles-5, see Synthesis Example S-5 below. |
| MSP-6 | Modified Silica Particles-6, see Synthesis Example S-6 below. |
| SP-1 | Silica Particles-1, fumed silica particles commercially available as "CABOSPERSE 2017A" from Cabot Corporation, Boston, MA. |
| Silane-1 | Hydrophilic silane-1, commercially available as "A1230" from Momentive Performance Materials, Inc, Waterford, NY. |
| Silane-2 | Hydrophobic silane, commercially available as isooctyl trimethoxy silane available from Gelest, Morrisville, PA. |
| PDMS Silane | PDMS Silane, polydimethyl siloxane-functional silane, prepared as described in Synthesis Example S-7 below. |
| AD-1 | Acrylic Dispersion-1, a one-pack, self-crosslinking acrylic dispersion commercially available as "JONCRYL 2981" from BASF. |
| AD-2 | Acrylic Dispersion-2 is a 45% solids all-acrylic emulsion in water commercially available as RHOPLEX TR-407 from Dow Chemical Company. |
| Surf-1 | Surfactant-1, commercially available as DOW CORNING Q2-5212 SUPERWETTING AGENT, from Dow Corning, Midland, MI. |
| Surf-2 | Surfactant-2, commercially available as BYK 346, from ALTANA, Wallingford, CT. |
| IPA | Isopropyl alcohol |
| PET Film | Primed film of Polyethylene terephthalate of 5 mil (127 micrometers) thickness. |
| Silicone PSA-1 | See Preparative Example P1 below |
| Silicone PSA-2 | See Preparative Example P2 below |
| Acrylic PSA-3 | PSA-3 is an isooctyl acrylate/acrylic acid (IOA/AA) pressure sensitive adhesive polymer with an IOA/AA ratio of 93/7 used as a 30% solids solution in ethyl acetate. The preparation of such acrylic pressure sensitive adhesives is described in U.S. Pat. No. RE 24,906 (Ulrich). |
| Acrylic PSA-4 | PSA-4 is an isooctyl acrylate/acrylic acid (IOA/AA) pressure sensitive adhesive polymer with an IOA/AA ratio of 96/4 used as a 30% solids solution in ethyl acetate. The preparation of such acrylic pressure sensitive adhesives is described in U.S. Pat. No. RE 24,906 (Ulrich). |
| Tackifier Resin-1 | MQ tackifier resin commercially available as SR-545 from General Electric, Waterford, NY. |
| IPM | Isopropyl myristate |

Test Methods

Rub Off Test

The fragility of pressure sensitive adhesive coatings were tested by slitting the coated laminate sample and rubbing with a finger perpendicular to the cut edge. The coatings are rated "Poor" if the coating rubs off (delaminates) after 1-2 rubs; "Medium" if the coating can be removed in 8-10 rubs (but it is difficult to effect delamination); and "Good" if the coating cannot be delaminated by rubbing. It should be noted that with the silicone pressure sensitive adhesive coatings used in these examples, a Rub Off Test value of Medium is typically satisfactory for many applications.

SYNTHESIS EXAMPLES

Synthesis Example S-1: Preparation of Modified Silica Particles MSP-1

200 g of SP-1 (17.08% solids) was measured into a 3-neck round-bottom flask, the flask was lowered into an 80° C. oil bath, and a condenser was attached. To this stirred mixture was added 9.54 g of Silane-1. The reaction was allowed to stir for 16 hours. Then 0.51 g of Silane-2 was added to the flask and the mixture was stirred for 6 hours. After completion of the reaction, the contents were transferred to a plastic jug and % solids were taken. The final % solids of the solution was 16.99%. The MSP-1 was 75% covered with silanes, in the ratio of Silane-1/Silane-2 of 90/10.

Synthesis Example S-2: Preparation of Modified Silica Particles MSP-2

The same procedure used for Synthesis Example S-1 above was followed with the appropriate reagents to give a final % solids of 20.51 in water of MSP-2 that was 75% covered with silanes, in the ratio of Silane-1/Silane-2 of 95/5.

Synthesis Example S-3: Preparation of Modified Silica Particles MSP-3

The same procedure used for Synthesis Example S-1 above was followed with the appropriate reagents to give a final % solids of 20.11 in water of MSP-3 that was 75% covered with silanes, in the ratio of Silane-1/Silane-2 of 85/15.

Synthesis Example S-4: Preparation of Modified Silica Particles MSP-4

The same procedure used for Synthesis Example S-1 above was followed with the appropriate reagents to give a final % solids of 17.42 in water of MSP-4 that was 90% covered with Silane-2.

Synthesis Example S-5: Preparation of Modified Silica Particles MSP-5

The same procedure used for Synthesis Example S-1 above was followed with the appropriate reagents to give a final % solids of 20.44 in water of MSP-4 that was 90% covered with Silane-1.

Synthesis Example S-6: Preparation of Modified Silica Particles MSP-6

The same procedure used for Synthesis Example S-1 above was followed with the appropriate reagents to give a final % solids of 18.0 in water of MSP-6 that was 75% covered with silanes, in the ratio of Silane-1/PDMS Silane of 90/10.

Synthesis Example S-7: Preparation of PDMS Silane

Into a 100 mL 2-neck round bottom flask was measured 40.0 g of a monocarbinol terminated polydimethylsiloxane (MCR-C12 commercially available from Gelest Inc., Morrisville, Pa.). With magnetic stirring, was added 0.01 g of dibutyltin dilaurate and 8.75 g of an isocyanate functional silane (SILQUEST A-LINK 35 commercially available from Momentive Performance Materials Inc., Friendly, W. Va.) in portions over a 60 minute time period. The mixture was stirred at ambient temperature (approximately 22° C.) for about 20 hours. A small sample of the reaction mixture was analyzed by FT-IR for absence of an isocyanate peak. The contents of the flask were transferred to a polyethylene bottle, yielding 48.3 g of a clear, nearly colorless liquid.

PREPARATIVE EXAMPLES

Preparative Example P1: Preparation of Silicone PSA-1

Silicone PSA-1 was used as a 30% solids solution in ethyl acetate prepared from a combination of polydimethyl siloxane oxamide elastomer prepared from a polydimethyl siloxane diamine with molecular weight of 25,000 Daltons made according to the methods in US Patent Publication No. 2012/0271025; Tackifier Resin-1; and IPM in a ratio of 75/20/5.

Preparative Example P2: Preparation of Silicone PSA-2

Silicone PSA-2 was used as a 30% solids solution in ethyl acetate prepared from a combination of polydimethyl siloxane oxamide elastomer prepared from a polydimethyl siloxane diamine with molecular weight of 25,000 Daltons made according to the methods in US Patent Publication No. 2012/0271025; and Tackifier Resin-1 in a ratio of 90/10.

Examples 1A and 1B

A mixture of MSP-1; AD-1; and Surf-1 in a ratio of 60/40/1 was prepared at a 10% solids in a mixture of water and IPA (95:5). The mixture was coated onto PET Film-1 with a Number 4 Mayer rod and dried in a 100° C. oven for 2 minutes.

To this dried coating was coated PSA-1 (Example 1A) or PSA-2 (Example 1B) with an 8 mil (203 micrometer) gap. The coated samples were dried in a 65° C. oven for 16 hours and allowed to cool to ambient temperature for 2 hours. Rub Off Testing was carried out on the dried samples using the test method described above. Both Example 1A and 1B had "Good" Rub Off Test results.

Examples 2A and 2B

A mixture of MSP-1; AD-2; and Surf-1 in a ratio of 60/40/1 was prepared at a 10% solids in a mixture of water and IPA (95:5). The mixture was coated onto PET Film-1 with a Number 4 Mayer rod and dried in a 100° C. oven for 2 minutes.

To this dried coating was coated PSA-1 (Example 2A) or PSA-2 (Example 2B) with an 8 mil (203 micrometer) gap. The coated samples were dried in a 65° C. oven for 16 hours and allowed to cool to ambient temperature for 2 hours. Rub Off Testing was carried out on the dried samples using the test method described above. Example 2A had a "Good" Rub Off Test result and Example 2B had "Medium" Rub Off Test result.

Examples 3A and 3B

A mixture of MSP-1; AD-1; and Surf-2 in a ratio of 60/40/1 was prepared at a 10% solids in a mixture of water and IPA (70:30). The mixture was coated onto PET Film-1 with a Number 4 Mayer rod and dried in a 100° C. oven for 2 minutes.

To this dried coating was coated PSA-1 (Example 3A) or PSA-2 (Example 3B) with an 8 mil (203 micrometer) gap. The coated samples were dried in a 65° C. oven for 16 hours and allowed to cool to ambient temperature for 2 hours. Rub Off Testing was carried out on the dried samples using the test method described above. Both Example 3A and 3B had "Good" Rub Off Test results.

Examples 4A and 4B

A mixture of MSP-1; AD-1; and Surf-1 in a ratio of 60/40/1 was prepared at a 10% solids in a mixture of water and IPA (95:5). The mixture was coated onto PET Film-1 with a Number 4 Mayer rod and dried in a 100° C. oven for 2 minutes.

To this dried coating was coated PSA-3 (Example 1A) or PSA-4 (Example 1B) with an 8 mil (203 micrometer) gap. The coated samples were dried in a 65° C. oven for 16 hours and allowed to cool to ambient temperature for 2 hours. Rub Off Testing was carried out on the dried samples using the test method described above. Both Example 4A and 4B had "Good" Rub Off Test results.

Examples 5A-5D

A mixture of MSP-2; AD-1; and Surf-1 in a ratio of 60/40/1 was prepared at a 10% solids in a mixture of water and IPA (95:5). The mixture was coated onto PET Film-1 with a Number 4 Mayer rod and dried in a 100° C. oven for 2 minutes.

To this dried coating was coated PSA-1 (Example 5A), PSA-2 (Example 5B), PSA-3 (Example 5C), or PSA-4 (Example 5D) with an 8 mil (203 micrometer) gap. The coated samples were dried in a 65° C. oven for 16 hours and allowed to cool to ambient temperature for 2 hours. Rub Off Testing was carried out on the dried samples using the test method described above. Examples 5A and 5C had "Good" Rub Off Test results, and Examples 5B and 5D had "Medium" Rub Off Test results.

Examples 6A-6D

A mixture of MSP-3; AD-1; and Surf-1 in a ratio of 60/40/1 was prepared at a 10% solids in a mixture of water and IPA (95:5). The mixture was coated onto PET Film-1 with a Number 4 Mayer rod and dried in a 100° C. oven for 2 minutes.

To this dried coating was coated PSA-1 (Example 6A), PSA-2 (Example 6B), PSA-3 (Example 6C), or PSA-4 (Example 6D) with an 8 mil (203 micrometer) gap. The coated samples were dried in a 65° C. oven for 16 hours and allowed to cool to ambient temperature for 2 hours. Rub Off Testing was carried out on the dried samples using the test method described above. Examples 6A and 6B had "Good" Rub Off Test results, and Examples 6C and 6D had "Medium" Rub Off Test results.

Comparative Examples C1A-C1D

A mixture of MSP-4; AD-1; and Surf-1 in a ratio of 60/40/1 was prepared at a 10% solids in a mixture of water and IPA (95:5). The mixture was coated onto PET Film-1 with a Number 4 Mayer rod and dried in a 100° C. oven for 2 minutes.

To this dried coating was coated PSA-1 (Comparative Example C1A), PSA-2 (Comparative Example C1B), PSA-3 (Comparative Example C1C), or PSA-4 (Comparative Example C1D) with an 8 mil (203 micrometer) gap. The coated samples were dried in a 65° C. oven for 16 hours and allowed to cool to ambient temperature for 2 hours. Rub Off Testing was carried out on the dried samples using the test method described above. Comparative Examples C1A, C1B, and C1C had "Poor" Rub Off Test results, and Comparative Example CM had "Medium" Rub Off Test results.

Examples 7A-7D

A mixture of MSP-6; AD-1; and Surf-1 in a ratio of 60/40/1 was prepared at a 10% solids in a mixture of water and IPA (95:5). The mixture was coated onto PET Film-1 with a Number 4 Mayer rod and dried in a 100° C. oven for 2 minutes.

To this dried coating was coated PSA-1 (Example 7A), PSA-2 (Example 7B), PSA-3 (Example 7C), or PSA-4 (Example 7D) with an 8 mil (203 micrometer) gap. The coated samples were dried in a 65° C. oven for 16 hours and allowed to cool to ambient temperature for 2 hours. Rub Off Testing was carried out on the dried samples using the test method described above. Examples 7A and 7B had "Poor" Rub Off Test results, and Example 7C had "Good" Rub Off Test result, and 6D had "Medium" Rub Off Test result.

What is claimed is:

1. A suspension comprising:
   surface treated silica particles, wherein the surface treated silica particles comprise a mixture of hydrophobic and hydrophilic silane surface treatment agent, wherein the ratio of hydrophilic silane surface treatment agent to hydrophobic silane surface treatment agent is greater than 1;
   a water dispersable binder resin;
   at least one surfactant; and
   an aqueous solvent comprising at least water; wherein the hydrophobic and hydrophilic silane surface treatment agents are each of the general structure: $R^1R^2R^3Si-X$ wherein each $R^1$, $R^2$, and $R^3$ is independently an alky or alkoxy group with the proviso that at least one of $R^1$, $R^2$, and $R^3$ is an alkoxy group with 1-3 carbon atoms, and wherein the X group is an alkylene oxide group when the silane is a hydrophilic silane surface treatment agent and the X group is an alkyl group with 1-12 carbon atoms, an aryl group, or a polydimethylsiloxane group when the silane is a hydrophobic silane surface treatment agent.

2. The suspension of claim 1, wherein the surface treated silica particles comprise at least 75% surface coverage by the surface treatment agents.

3. The suspension of claim 1, wherein the water dispersable binder resin comprises a (meth)acrylate binder resin, a polyvinyl alcohol binder resin, or a combination thereof.

4. The suspension of claim 1, wherein the ratio of hydrophilic silane surface treatment agent to hydrophobic silane surface treatment agent is in the range of 90:10 to 98:2.

5. The suspension of claim 1, wherein the hydrophobic silane surface treatment agent comprises at least one silane surface treatment agent comprising an alkyl group with 1-12 carbon atoms.

6. The suspension of claim 1, wherein the hydrophilic silane surface treatment agent comprises at least one silane surface treatment agent comprising polyethylene oxide units.

7. The suspension of claim 1, wherein the silica particles comprise fumed silica particles.

8. The suspension of claim 1, wherein the silica particles are irregularly shaped particles where the irregularly shaped particles have a surface area equivalent to a spherical particle with a surface area of 14 $nm^2$.

9. A tie layer comprising:
a nanostructured layer comprising a dried coating of a suspension comprising:
surface treated silica particles, wherein the surface treated silica particles comprise a mixture of hydrophobic and hydrophilic silane surface treatment agent, wherein the ratio of hydrophilic silane surface treatment agent to hydrophobic silane surface treatment agent is greater than 1;
a water dispersable binder resin;
at least one surfactant; and
an aqueous solvent comprising at least water; wherein the hydrophobic and hydrophilic silane surface treatment agents are each of the general structure: $R^1R^2R^3Si-X$ wherein each $R^1$, $R^2$, and $R^3$ is independently an alky or alkoxy group with the proviso that at least one of $R^1$, $R^2$, and $R^3$ is an alkoxy group with 1-3 carbon atoms, and wherein the X group is an alkylene oxide group when the silane is a hydrophilic silane surface treatment agent and the X group is an alkyl group with 1-12 carbon atoms, an aryl group, or a polydimethyl siloxane group when the silane is a hydrophobic silane surface treatment agent, and wherein the tie layer is capable of adhering to two different materials to form laminate articles.

10. The tie layer of claim 9, wherein the surface treated silica particles comprise at least 75% surface coverage by the surface treatment agents.

11. The tie layer of claim 9, wherein the water dispersable binder resin comprises a (meth)acrylate binder resin, a polyvinyl alcohol binder resin, or a combination thereof.

12. The tie layer of claim 9, wherein the ratio of hydrophilic silane surface treatment agent to hydrophobic silane surface treatment agent is in the range of 90:10 to 98:2.

13. The tie layer of claim 9, wherein the hydrophobic silane surface treatment agent comprises at least one silane surface treatment agent comprising an alkyl group with 1-12 carbon atoms.

14. The tie layer of claim 9, wherein the hydrophilic silane surface treatment agent comprises at least one silane surface treatment agent comprising polyethylene oxide units.

15. The tie layer of claim 9, wherein the tie layer has a thickness of from 0.1 to 5.0 micrometers.

16. The tie layer of claim 9, wherein the tie layer comprises an antireflection layer.

17. A laminate comprising:
a substrate with a first major surface and second major surface;
a tie layer in contact with at least a portion of the second major surface of the substrate,
wherein the tie layer comprises a nanostructured layer comprising a dried coating of a suspension comprising:
surface treated silica particles, wherein the surface treated silica particles comprise a mixture of hydrophobic and hydrophilic silane surface treatment agent, wherein the ratio of hydrophilic silane surface treatment agent to hydrophobic silane surface treatment agent is greater than 1;
a water dispersable binder resin;
at least one surfactant; and
an aqueous solvent comprising at least water; wherein the hydrophobic and hydrophilic silane surface treatment agents are each of the general structure:
$R^1R^2R^3Si-X$
wherein each $R^1$, $R^2$, and $R^3$ is independently an alky or alkoxy group with the proviso that at least one of $R^1$, $R^2$, and $R^3$ is an alkoxy group with 1-3 carbon atoms, and wherein the X group is an alkylene oxide group when the silane is a hydrophilic silane surface treatment agent and the X group is an alkyl group with 1-12 carbon atoms, an aryl group, or a polydimethyl siloxane group when the silane is a hydrophobic silane surface treatment agent, and wherein the tie layer is capable of adhering to two different materials to form laminate articles; and
a silicone-based or (meth)acrylate based layer in contact with the tie layer.

18. The laminate of claim 17, wherein the silicone-based layer comprises a siloxane pressure sensitive adhesive.

19. The laminate of claim 17, further comprising at least one additional layer in contact with the silicone-based or (meth)acrylate-based layer.

20. The laminate of claim 17, wherein the surface treated silica particles comprise a mixture of hydrophilic and polydimethyl siloxane silane surface treatment agent, and wherein the (meth)acrylate-based layer comprises a (meth)acrylate pressure sensitive adhesive.

21. A method of preparing the laminate construction of claim 17 comprising:
providing a substrate with a first major surface and second major surface;
providing a waterborne suspension, wherein the waterborne suspension comprises:
surface treated silica particles, wherein the surface treated silica particles comprise a mixture of hydrophobic and hydrophilic silane surface treatment agent, wherein the ratio of hydrophilic silane surface treatment agent to hydrophobic silane surface treatment agent is greater than 1;
a water dispersable binder resin;
at least one surfactant; and
an aqueous solvent comprising at least water;
coating the waterborne suspension on at least a portion of the second major surface of the substrate;
drying the coating of the waterborne suspension to form a nanostructured tie layer; and
applying a silicone-based or (meth)acrylate-based layer to the nanostructured tie layer to form a laminate.

22. The method of claim 21, further comprising contacting a second substrate to the silicone-based or (meth)acrylate-based layer.

* * * * *

UNITED STATES PATENT AND TRADEMARK OFFICE
CERTIFICATE OF CORRECTION

PATENT NO. : 10,723,894 B2
APPLICATION NO. : 15/537714
DATED : July 28, 2020
INVENTOR(S) : Lan H. Liu et al.

It is certified that error appears in the above-identified patent and that said Letters Patent is hereby corrected as shown below:

In the Claims

Column 22
Line 36-37, In Claim 1, delete "alky or alkoxy" and insert -- an alkyl or alkoxy --, therefor.

Column 23
Line 16, In Claim 9, delete "alky or alkoxy" and insert -- alkyl or alkoxy --, therefor.

Column 24
Line 9-10, In Claim 17, delete "alky or alkoxy" and insert -- alkyl or alkoxy --, therefor.

Signed and Sealed this
Seventh Day of November, 2023

Katherine Kelly Vidal
*Director of the United States Patent and Trademark Office*